(12) United States Patent
Fernando et al.

(10) Patent No.: US 9,468,234 B2
(45) Date of Patent: Oct. 18, 2016

(54) ARTICLE INCLUDING IDENTIFICATION INFORMATION FOR USE IN AN ELECTRICALLY HEATED SMOKING SYSTEM

(71) Applicant: Philip Morris USA Inc., Richmond, VA (US)

(72) Inventors: Felix Fernando, Workingham (GB); Jean-Pierre Cordey, Cheseaux (CH)

(73) Assignee: PHILIP MORRIS USA INC., Richmond, VA (US)

( * ) Notice: Subject to any disclaimer, the term of this patent is extended or adjusted under 35 U.S.C. 154(b) by 495 days.

(21) Appl. No.: 14/141,116

(22) Filed: Dec. 26, 2013

(65) Prior Publication Data

US 2014/0196736 A1      Jul. 17, 2014

Related U.S. Application Data

(62) Division of application No. 12/645,254, filed on Dec. 22, 2009, now Pat. No. 8,689,804.

(30) Foreign Application Priority Data

Dec. 24, 2008   (EP) ..................................... 08254145

(51) Int. Cl.
*A24F 47/00*       (2006.01)

(52) U.S. Cl.
CPC .................................. *A24F 47/008* (2013.01)

(58) Field of Classification Search
None
See application file for complete search history.

(56) References Cited

U.S. PATENT DOCUMENTS

| 4,436,991 A | 3/1984 | Albert et al. |
| 5,060,671 A | 10/1991 | Counts et al. |

(Continued)

FOREIGN PATENT DOCUMENTS

| CN | 1209731 A | 3/1999 |
| CN | 1280661 A | 1/2001 |

(Continued)

OTHER PUBLICATIONS

The European Search Report for European Patent Application No. 08254145 dated Jun. 2, 2009.

(Continued)

*Primary Examiner* — Michael J Felton
(74) *Attorney, Agent, or Firm* — Buchanan Ingersoll & Rooney PC (57) ABSTRACT

A smoking article includes identification information encoded on the smoking article. The smoking article can be used with an electrically heated smoking system having a detector for detecting the smoking article and distinguishing the smoking article from other articles based on the identification information. A cleaning article includes identification information encoded on the cleaning article. The cleaning article cleans an electrically heated smoking system having a detector for detecting the cleaning article and distinguishing the cleaning article from other articles based on the identification information. An electrically heated smoking system for receiving an article configured for use with the smoking system includes: a cavity for receiving the article having identification information encoded thereon, a heating element, a power supply, electrical hardware, and a detector capable of detecting the presence of the article in the cavity and distinguishing the article from other articles based on the identification information.

10 Claims, 3 Drawing Sheets

(56) References Cited

U.S. PATENT DOCUMENTS

| | | |
|---|---|---|
| 5,388,594 A | 2/1995 | Counts et al. |
| 5,396,911 A | 3/1995 | Casey, III et al. |
| 5,498,855 A | 3/1996 | Deevi et al. |
| 5,505,214 A | 4/1996 | Collins et al. |
| 5,514,630 A | 5/1996 | Willkens et al. |
| 5,591,368 A | 1/1997 | Fleischhauer et al. |
| 5,613,505 A | 3/1997 | Campbell et al. |
| 5,902,501 A | 5/1999 | Nunnally et al. |
| 5,934,289 A | 8/1999 | Watkins et al. |
| 5,967,148 A | 10/1999 | Harris et al. |
| 6,119,700 A | 9/2000 | Fleischhauer et al. |
| 6,803,550 B2 | 10/2004 | Sharpe et al. |
| 2004/0200492 A1 | 10/2004 | Brooks |

FOREIGN PATENT DOCUMENTS

| | | |
|---|---|---|
| CN | 1316205 A | 10/2001 |
| DE | 10241127 A1 | 3/2004 |
| DE | 698 24 982 T2 | 10/2004 |
| EP | 0 277 519 A2 | 8/1988 |
| EP | 0 857 431 A1 | 8/1998 |
| EP | 0 093 071 A1 | 1/1999 |
| EP | 1 618 803 A1 | 1/2006 |
| EP | 1 736 062 A2 | 12/2006 |
| EP | 1 736 065 A1 | 12/2006 |
| JP | 2006-320286 A | 11/2006 |
| KR | 100636287 B1 | 10/2006 |
| WO | 00/28843 A1 | 5/2000 |
| WO | 03/037412 A2 | 5/2003 |
| WO | 03/095688 A2 | 11/2003 |
| WO | 2004/043175 A1 | 5/2004 |
| WO | 2005/120614 A1 | 12/2005 |
| WO | 2007/024130 A1 | 3/2007 |
| WO | 2007/066374 A1 | 6/2007 |
| WO | 2007/131449 A1 | 11/2007 |
| WO | 2007/131450 A1 | 11/2007 |

OTHER PUBLICATIONS

International Preliminary Report on Patentability and Written Opinion dated Jul. 7, 2011 for PCT/IB2009/007969.
Chinese Search Report dated Dec. 20, 2012 for Chinese Patent Application No. 200980152284.3.
Chinese Notification of the First Office Action dated Dec. 28, 2012 for Chinese Patent Application No. 200980152284.3.

Figure 2a

ARTICLE INCLUDING IDENTIFICATION INFORMATION FOR USE IN AN ELECTRICALLY HEATED SMOKING SYSTEM

CROSS-REFERENCE TO RELATED APPLICATION

This application is a divisional application of application Ser. No. 12/645,254, filed Dec. 22, 2009 entitled AN ARTICLE INCLUDING IDENTIFICATION INFORMATION FOR USE IN AN ELECTRICALLY HEATED SMOKING SYSTEM which application claims priority to European Application No. 08254145.9, filed Dec. 24, 2008, the entire content of each is incorporated herein by reference thereto.

BACKGROUND

The present invention relates to an article including identification information, for use in an electrically heated smoking system. The present invention further relates to an electrically heated smoking system for receiving such an article. The article may be a cleaning article or a smoking article.

A number of prior art documents, for example U.S. Pat. No. 5,060,671, U.S. Pat. No. 5,388,594, U.S. Pat. No. 5,505,214, WO-A-2004/043175, EP-A-1 618 803, EP-A 1,736,065 and WO-A-2007/131449, disclose electrically operated smoking systems, having a number of advantages. One advantage is that they significantly reduce sidestream smoke, while permitting the smoker to selectively suspend and reinitiate smoking.

Electrically heated smoking systems typically include a power supply, such as a battery, connected to a heater to heat an aerosol-forming substrate, to form the aerosol which is provided to the smoker. In operation, these electrically heated smoking systems typically provide a high power pulse to the heater to provide the temperature range desired for operation and to release the volatile compounds. Electrically heated smoking systems may be reusable and may be arranged to receive a disposable smoking article, containing the aerosol-forming substrate, to form the aerosol.

Smoking articles developed for electrically heated smoking systems are typically specially designed, because the flavors are generated and released by a controlled heating of the aerosol-forming substrate, without the combustion that takes place in lit-end cigarettes and other smoking articles. Therefore, the structure of a smoking article designed for an electrically heated smoking system may be different from the structure of a lit-end smoking article. Using a lit-end smoking article with an electrically heated smoking system may result in a poor smoking experience for the user, and may also damage the system because, for example, the smoking article is not compatible with the system. In addition, there may be a number of different smoking articles which are each configured for use with the system, but which each provide a different smoking experience for the user.

Some of the electrically heated smoking systems of the prior art include a detector which is able to detect the presence of a smoking article received in the smoking system. An improved electrically heated smoking system including a detector which offers additional functionality to the smoker, and an improved article for use with such a system is provided herein.

Summary of Selected Aspects of the Invention

A smoking article, including identification information encoded on the smoking article, is configured for use with an electrically heated smoking system having a detector for detecting the smoking article and distinguishing the smoking article from other articles based on the identification information. In the preferred embodiment, the identification information is printed on the article. Preferably, the identification information includes visible ink, ultra violet (UV) ink, infra red (IR) ink, phosphorescent ink, fluorescent ink or metallic ink. Also preferably, the identification information includes one or more of: smoking article type, aerosol-forming substrate type, cleaning article type, cleaning means information, cleaning ingredient type, date of production, place of production, batch number and other production details, and use-by date. Moreover, the identification information is arranged to change as the article is used.

A cleaning article, including identification information encoded on the cleaning article, is configured for cleaning an electrically heated smoking system having a detector for detecting the cleaning article and distinguishing the cleaning article from other articles based on the identification information. In the preferred embodiment, the identification information is printed on the article. Preferably, the identification information includes visible ink, ultra violet (UV) ink, infra red (IR) ink, phosphorescent ink, fluorescent ink or metallic ink. Also preferably, the identification information includes one or more of: smoking article type, aerosol-forming substrate type, cleaning article type, cleaning means information, cleaning ingredient type, date of production, place of production, batch number and other production details, and use-by date. Moreover, the identification information is arranged to change as the article is used.

An electrically heated smoking system for receiving an article configured for use with the smoking system includes a cavity for at least partially receiving the article, the article including identification information encoded thereon, at least one heating element, a power supply for supplying power to the at least one heating element, electrical hardware connected to the power supply and the at least one heating element, and a detector capable of detecting the presence of the article in the cavity and distinguishing the article from other articles, based on the identification information. In the preferred embodiment, the article is selected from a smoking article and a cleaning article. Preferably, the system is arranged to initiate when the detector detects the article in the cavity. Also preferably, the electrical hardware is arranged to establish a heating protocol for the at least one heating element based on the particular article identified by the detector. In the preferred embodiment, the system is configured to receive a plurality of smoking articles including identification information, and the system is arranged to operate only with a subset of the plurality of smoking articles configured for use with the smoking system, each smoking article of the subset being distinguishable by the detector, based on the identification information. Moreover, the detector includes an optical sensor. The optical sensor includes at least one light emitter and at least one light sensor, and the identification information is printed on the article. Preferably, the identification information is configured to be altered during heating so as to indicate whether the article has been used. Also preferably, the electrical hardware includes a sensor to detect air flow indicative of a user taking a puff.

A smoking article specially adapted for use with the electrically heated smoking system is also provided.

BRIEF DESCRIPTION OF THE DRAWINGS

The invention will be further described, by way of example only, with reference to the accompanying drawings.

DETAILED DESCRIPTION

A smoking article including identification information encoded on the smoking article, and configured for use with an electrically heated smoking system having a detector for detecting the smoking article and distinguishing the smoking article from other articles, based on the identification information is provided.

The smoking article can be detected by the detector, and one smoking article can be distinguished from another article, based on the identification information. Preferably, the article is one article of a plurality of articles configured for use with the system, and the detector is capable of distinguishing the article from other of the plurality of articles configured for use with the system, based on the identification information.

A cleaning article including identification information encoded on the cleaning article, and configured for cleaning an electrically heated smoking system having a detector for detecting the cleaning article and distinguishing the cleaning article from other articles, based on the identification information is also provided.

The cleaning article can be detected by the detector, and one cleaning article can be distinguished from another article, based on the identification information. Preferably, the article is one article of a plurality of articles configured for use with the system, and the detector is capable of distinguishing the article from other of the plurality of articles configured for use with the system, based on the identification information.

Preferably, the identification information is printed on the smoking article or the cleaning article. The identification information may include visible ink, ultra violet (UV) ink, infra red (IR) ink, phosphorescent ink, fluorescent ink or metallic ink. Further identification information may be included in the smoking article or cleaning article.

In one embodiment, the identification information includes a linear code or a bar code. In another embodiment, the identification information includes one or more of: smoking or cleaning article type, aerosol-forming substrate type, cleaning ingredient type, date of production, place of production, batch number and other production details, and use-by date.

In a further embodiment, the identification information is arranged to change as the smoking article is smoked or the cleaning article is used to clean the system.

Preferably, the smoking article includes an aerosol-forming substrate. The aerosol-forming substrate includes a tobacco-containing material containing volatile tobacco flavor compounds which are released from the substrate upon heating. Alternatively, the aerosol-forming substrate may include a non-tobacco material such as those used in the devices of EP-A-1 750 788 and EP-A-1 439 876. Preferably, the aerosol-forming substrate further includes an aerosol former. Examples of suitable aerosol formers are glycerine and propylene glycol. Additional examples of potentially suitable aerosol formers are described in EP-A-0 277 519 and U.S. Pat. No. 5,396,911.

The aerosol-forming substrate may be a solid substrate. The solid substrate may include, for example, one or more of: powder, granules, pellets, shreds, spaghettis, strips or sheets containing one or more of: herb leaf, tobacco leaf, fragments of tobacco ribs, reconstituted tobacco, homogenized tobacco, extruded tobacco and expanded tobacco. Optionally, the solid substrate may contain additional tobacco or non-tobacco volatile flavor compounds, to be released upon heating of the substrate.

Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, such as those disclosed in U.S. Pat. No. 5,505,214, U.S. Pat. No. 5,591,368 and U.S. Pat. No. 5,388,594, or on its outer surface, or on both its inner and outer surfaces. Such a tubular carrier may be formed of, for example, a paper, or paper like material, a non-woven carbon fiber mat, a low mass open mesh metallic screen, or a perforated metallic foil or any other thermally stable polymer matrix. The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavor delivery during use. Alternatively, the carrier may be a non-woven fabric or fiber bundle into which tobacco components have been incorporated, such as that described in EP-A-0 857 431. The non-woven fabric or fiber bundle may include, for example, carbon fibers, natural cellulose fibers, or cellulose derivative fibers.

The aerosol-forming substrate may be a liquid substrate and the smoking article may include means for retaining the liquid substrate. For example, the smoking article may include a container, such as that described in EP-A-0 893 071. Alternatively or in addition, the smoking article may include a porous carrier material, into which the liquid substrate may be absorbed, as described in WO-A-2007/024130, WO-A-2007/066374, EP-A-1 736 062, WO-A-2007/131449 and WO-A-2007/131450. The aerosol-forming substrate may alternatively be any other sort of substrate, for example, a gas substrate, or any combination of the various types of substrate.

An electrically heated smoking system for receiving an article configured for use with the smoking system is also provided. The system includes: a cavity for at least partially receiving the article, the article including identification information encoded thereon; at least one heating element; a power supply for supplying power to the at least one heating element; electrical hardware connected to the power supply and the at least one heating element; and a detector capable of detecting the presence of the article in the cavity and distinguishing the article from other articles, based on the identification information.

The detector is not only able to detect the presence of the article in the cavity, but is also able to distinguish between one article and other articles. This is done based on the identification information on the article. Preferably, the electrically heated smoking system is reusable.

Preferably, the article is selected from a smoking article and a cleaning article. Preferably, each smoking article is disposable. Preferably, each cleaning article is either disposable or reusable. The cleaning article may include one or more of: at least one cleaning tool, for example a brush, cloth, wipe or swab, for mechanical cleaning, and one or more cleaning ingredients for chemical cleaning.

During operation, the smoking article, and its aerosol-forming substrate, may be completely received in the cavity and thus completely contained within the electrically heated smoking system. In that case, a user may puff on a mouthpiece of the electrically heated smoking system. Alternatively, during operation, the smoking article may be partially received in the cavity such that the aerosol-forming substrate is fully or partially contained within the electrically heated smoking system. In that case, a user may puff directly on the smoking article or on a mouthpiece of the electrically heated smoking system.

Preferably, the system is arranged to initiate, when the detector detects the article in the cavity. The system may be initiated when the electrical hardware connects the power supply and the at least one heating element. Alternatively, or in addition, the system may be initiated when the system switches from a standby mode to an active mode. Alternatively, or in addition, the system may further include a switch and may be initiated when the switch is turned on, such that the at least one heating element is heated only when an article is detected in the cavity. Initiation of the system may additionally or alternatively include other steps.

The detector is capable of detecting whether or not an article is present in the cavity. Because of this, the system and article have a number of advantages. For example, power saving is provided because the system does not need to permanently remain in an active mode, but can remain in a standby mode, switching to the active mode only when an article is detected. In addition, the power used can be optimized for a particular user, when a smoking article is detected, depending on smoking habits of the user. The system also allows for a shorter time to first puff for a smoking article, because the article can be heated as soon as it is detected. This minimizes the time delay between a user's first puff and the user receiving the aerosol. Furthermore, safety may be improved because the system activates only when a valid article is detected. Therefore, there is no chance that the heating element will energize unless the valid article is present.

The detector may also be arranged to indicate when the article is removed from the cavity. In that case, the system may be arranged to switch from the active mode to the standby mode. Alternatively, or in addition, if the system includes a switch, the switch may be turned off when the article is removed from the cavity.

The detector is also capable of distinguishing between articles, which provides a number of advantages. In particular, the detector may be capable of distinguishing between a cleaning article and a smoking article. Additionally, the plurality of articles may include a plurality of smoking articles and the detector may be arranged to distinguish between each of the plurality of smoking articles configured for use with the smoking system. Furthermore, the plurality of articles may include a plurality of cleaning articles and the detector may be arranged to distinguish between each of the plurality of cleaning articles configured for use with the smoking system.

Preferably, the electrical hardware includes a programmable controller, for example, a microcontroller, for controlling operation of the heating element. In one embodiment, the controller may be programmable by software. Alternatively, the controller may include application specific hardware, such as an Application-Specific Integrated-Circuit (ASIC), which may be programmable by customizing the logic blocks within the hardware for a particular application. Preferably, the electrical hardware includes a processor. Additionally, the electrical hardware may include memory for storing heating preferences for particular smoking articles and, optionally, cleaning articles, user preferences, user smoking habits or other information. Preferably, the information stored can be updated and replaced depending on the particular smoking articles and cleaning articles usable with the smoking system. Also, the information may be downloaded from the smoking system.

In one exemplary embodiment, the electrical hardware includes a sensor to detect air flow indicative of a user taking a puff. The sensor may include a thermistor. The sensor may be an electro-mechanical device. Alternatively, the sensor may be any of: a mechanical device, an optical device, an opto-mechanical device and a micro electro mechanical systems (MEMS) based sensor. In that case, the electrical hardware may be arranged to provide an electric current pulse to the at least one heating element when the sensor senses a user taking a puff. In an alternative embodiment, the system further includes a manually operable switch, for a user to initiate a puff.

Preferably, the electrical hardware is arranged to establish a heating protocol for the at least one heating element based on the particular smoking article identified by the detector. The heating protocol may include one or more of: a maximum operating temperature for the heating element, a maximum heating time per puff, a minimum time between puffs, a maximum number of puffs per smoking article and a maximum total heating time for the smoking article. Establishing a heating protocol tailored to the particular smoking article is advantageous because the aerosol-forming substrates in particular smoking articles may require, or provide an improved smoking experience with, particular heating conditions. As already mentioned, preferably, the electrical hardware is programmable, in which case various heating protocols may be stored and updated.

Similarly, the electrical hardware may be arranged to establish a heating protocol for the at least one heating element based on the particular cleaning article identified by the detector. This might be advantageous if the cleaning ingredients of particular cleaning articles provide an improved clean in particular heating conditions. In one embodiment, the heating element may be arranged to activate a cleaning means, for example a cleaning ingredient, in the cleaning article.

Preferably, the electrical hardware is arranged to store information based on the particular smoking article identified by the detector. This allows monitoring of the various smoking article types used by a particular user, in order to track customer preferences. The information may be stored in the electrical hardware, preferably in the memory. The information is preferably retrievable from the electrical hardware.

In one embodiment, the article is one article of a plurality of articles configured for use with the system. In that case, the detector is capable of detecting the presence of the article in the cavity and also capable of distinguishing the article from other of the plurality of articles configured for use with the system, based on the identification information. The plurality of articles may include a plurality of smoking articles. Additionally, or alternatively, the plurality of articles may include one or more cleaning articles.

If the plurality of articles includes a plurality of smoking articles, the system may be arranged to operate with a subset of the plurality of smoking articles configured for use with the smoking system, each smoking article of the subset being distinguishable by the detector. In this way, the system can be set up for use with only particular smoking articles by, for example, programming the electrical hardware. This feature provides a number of advantages. First, this may reduce or eliminate counterfeit smoking articles for use with the system. Second, this may allow manufacturers or distributors to limit the smoking articles which can be used with the system, for example, to account for different smoking articles available in different regions or jurisdictions. Third, this can also allow the smoking system to be configured for use with different subsets of smoking articles. For example, the smoking system, on purchase, might be usable with a first subset of smoking articles. After an update to the electrical hardware, the smoking system might be usable with a second, larger, subset of smoking articles. After a further update to the electrical hardware, the smoking system might be usable with a third, larger, subset of smoking articles.

In addition, different smoking articles may be suited for use with different cleaning articles or a different frequency of cleaning. For example, a particular aerosol-forming substrate may require a particular cleaning ingredient, in order to achieve optimum cleaning of the smoking system. Therefore, if the smoking system is configured for use with different subsets of smoking articles, the smoking system might also be configured for use with corresponding subsets of cleaning articles.

Thus, by providing a detector which is able to distinguish between different types of articles configured for use with the system, various advantages can be provided. One such advantage is that the power consumption of the system can be optimized based on the particular cleaning article or smoking article identified. In addition, the detector can identify how many smoking articles, and which types of smoking articles, have been used with the smoking system, which may indicate when or how often the smoking system needs to be cleaned and with which cleaning article the smoking system needs to be cleaned. Also, the smoking system can distinguish between different types of smoking articles, different types of cleaning articles, and different batches of smoking articles of the same type, based on the information encoded in or on the article.

The detector may include an optical sensor including at least one light emitter and at least one light sensor. In a preferred embodiment, the detector may include one light emitter and one light sensor. In other embodiments, the detector may include more than one light sensor in the form of a one dimensional (e.g., linear) array of light sensors. In further embodiments, the detector may include more than one light sensor in the form of a two dimensional array of light sensors.

The identification information encoded on the article may include one or more of: smoking article type, aerosol-forming substrate type, cleaning article type, cleaning means information, cleaning ingredient type, date of production, place of production, batch number and other production details, and use-by date.

The identification information may be printed on the article in various forms. Various inks may be used for printing, including visible ink, ultra violet (UV) ink, infra red (IR) ink, phosphorescent ink, fluorescent ink and metallic ink. In one embodiment, the identification information includes a plurality of lines and spaces. The lines and spaces may extend substantially around the circumference of the article. The lines and spaces may have a fixed width or a variable width. The identification information may be encoded as a one dimensional barcode including the plurality of lines and spaces. In another embodiment, the identification information includes a two dimensional array. The two dimensional array may include a data matrix or any other two dimensional barcode.

In another embodiment, the detector includes an inductive sensor for sensing metallic elements in or on an article, and the identification information includes the metallic elements in or on the article. In that case, the detector preferably includes an induction coil positioned so as to surround an article received in the cavity. The identification information is preferably encoded in the form of the amount of metallic element in or on the article, different amounts identifying different articles. In one embodiment, the metallic element may be metallic ink.

In a given article, one or more different encoding methods may be used for the identification information. Similarly, the detector may include one or more different types of sensors.

In one embodiment, the article includes information configured to be altered during heating so as to indicate whether the article has been used. The information configured to be altered during heating may be provided in addition to the identification information. That is, two separate sets of information may be provided. Alternatively, the identification information may be configured to be altered during heating. That is, a single set of information may be provided. For example, information may be printed on the article, and the appearance of the information may change, or the information may completely disappear, during heating.

Further, the information configured to be altered during heating may be arranged to indicate how much the article has been used. For example, the information may indicate for how long the smoking article has been heated or how many puffs have been taken or how many cleaning operations the cleaning article has performed.

The at least one heating element may include a single heating element. Alternatively, the at least one heating element may include more than one heating element. The heating element or heating elements may be arranged appropriately so as to most effectively heat the aerosol-forming substrate in a smoking article or the cleaning means in a cleaning article.

The at least one heating element preferably includes an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may include doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium- titanium- zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required. Examples of suitable composite heating elements are disclosed in U.S. Pat. No. 5,498,855, WO-A-03/095688 and U.S. Pat. No. 5,514,630.

Alternatively, the at least one heating element may include an infra-red heating element, a photonic source such as, for example, those described in U.S. Pat. No. 5,934,289, or an inductive heating element, such as, for example, those described in U.S. Pat. No. 5,613,505.

The at least one heating element may take any suitable form. For example, the at least one heating element may take the form of a heating blade, such as those described in U.S. Pat. No. 5,388,594, U.S. Pat. No. 5,591,368 and U.S. Pat. No. 5,505,214. Alternatively, the at least one heating element may take the form of a casing or substrate having different electro-conductive portions, as described in EP-A-1 128 741, or an electrically resistive metallic tube, as described in WO-A-2007/066374. Alternatively, one or more heating needles or rods that run through the center of the aerosol-forming substrate, as described in KR-A-100636287 and JP-A-2006320286, may also be suitable. Alternatively, the at least one heating element may be a disk (end) heater or a combination of a disk heater with heating needles or rods. Other alternatives include a heating wire or filament, for example a Ni—Cr, platinum, tungsten or alloy wire, such as those described in EP-A-1 736 065, or a heating plate.

The at least one heating element may heat the aerosol-forming substrate by means of conduction. The heating element may be at least partially in contact with the substrate, or the carrier on which the substrate is deposited. Alternatively, the heat from the heating element may be conducted to the substrate by means of a heat conductive element. Alternatively, the at least one heating element may transfer heat to the incoming ambient air that is drawn through the electrically heated smoking system during use, which in turn heats the aerosol-forming substrate by convection. The ambient air may be heated before passing through the aerosol-forming substrate, as described in WO-A-2007/066374.

The electrically heated smoking system may further include an indicator for indicating when the at least one heating element is activated.

In one preferred embodiment, the power supply is a DC voltage source. In one embodiment, the voltage source is a Lithium-ion battery or a Lithium-ion phosphate battery. Alternatively, the voltage source may be a Nickel-metal hydride battery or a Nickel cadmium battery. The power supply may include a power cell contained in the electrically heated smoking system. Alternatively, the power supply may include circuitry chargeable by an external charging portion and an interface for connection to an external power source.

The electrically heated smoking system may further include a housing for receiving the smoking article or cleaning article and designed to be grasped by a user.

A smoking article specially adapted for use with the electrically heated smoking system of the third aspect of the invention is also provided.

Features described in relation to one aspect of the invention may also be applicable to other aspects of the invention.

Figure 1:
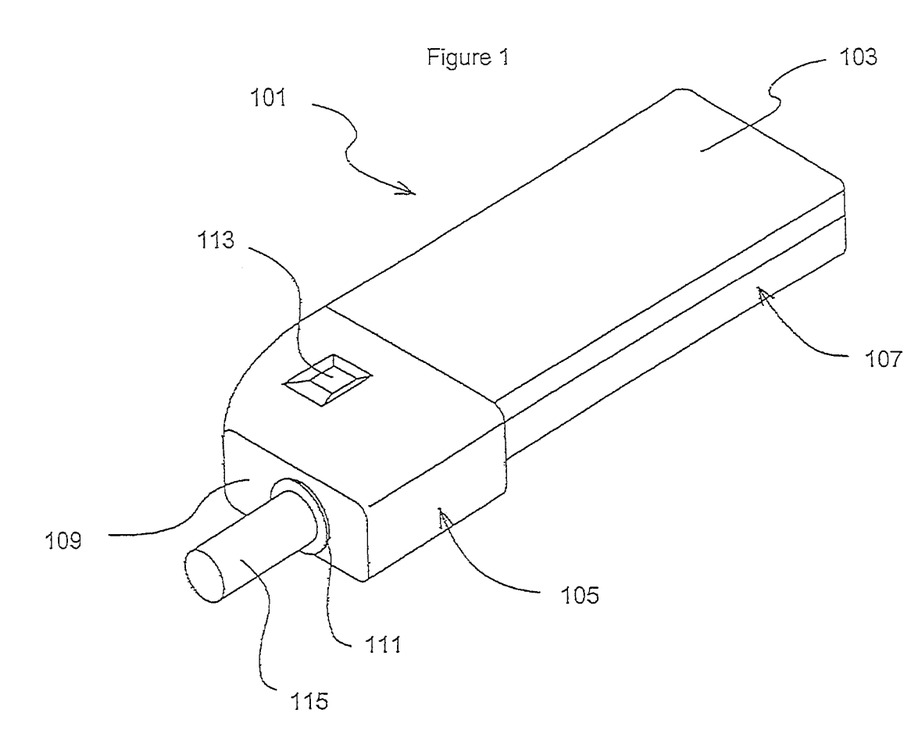
FIG. 1 is an illustration of an exemplary embodiment of an electrically heated smoking system having a smoking article inserted into an article receiving cavity.

FIG. 1 shows a perspective view of one exemplary embodiment of an electrically heated smoking system 101. The smoking system 101 includes a housing 103 having a front housing portion 105 and a rear housing portion 107. The front housing portion 105 includes a front end portion 109 having a cavity 111 capable of receiving an article, such as a smoking article or cleaning article. In FIG. 1, the smoking system 101 is shown with a smoking article in the form of cigarette 115 received in the cavity 111. In this embodiment, the front housing portion 105 also includes a display 113. The display 113 is not shown in detail, but it may include any suitable form of display, for example a liquid crystal display (LCD), a light-emitting diode (LED) display or a plasma display panel. In addition, the display may be arranged to show any required information, for example relating to smoking article or cleaning article.

The electrically heated smoking system 101 also includes a detector (not shown in FIG. 1) positioned in or adjacent the cavity 111. The detector is able to detect the presence of an article in the cavity and is also able to distinguish between the various articles which may be usable with the system. This will be discussed further with reference to FIG. 2.

FIG. 2 shows four exemplary embodiments of articles 115, 115', 115'', 115''', which may be used with the electrically heated smoking system of an embodiment of the invention.

Figure 2A:
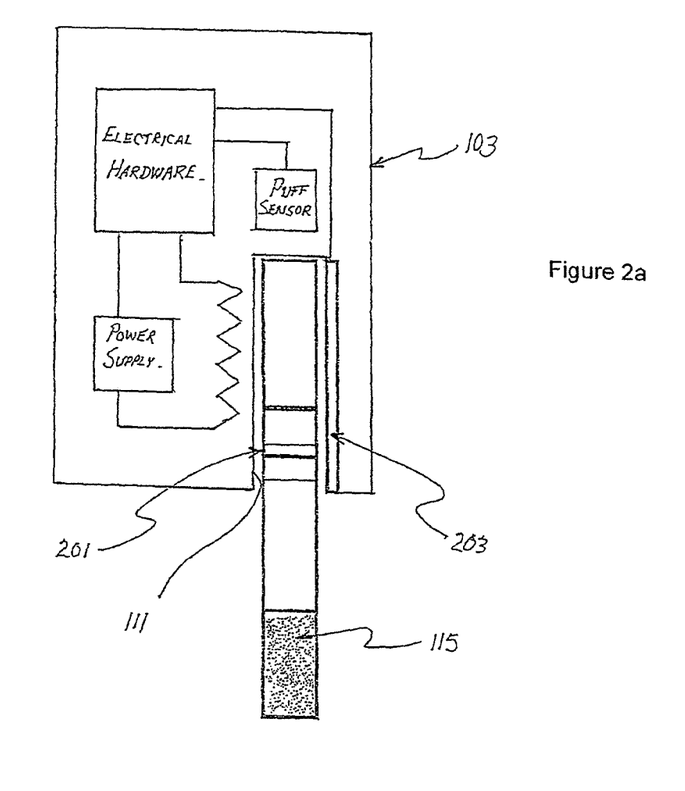
FIGS. 2a-2d illustrates four exemplary embodiments of articles configured for use with the electrically heated smoking system of an embodiment of the invention.

FIG. 2a shows a smoking article, in the form of a cigarette 115. In FIG. 2a, information related to the cigarette type is encoded in one-dimensional form, using a plurality of generally circular lines 201. The generally circular lines are located on the portion of the cigarette 115 which is to be received in the cavity 111. In this embodiment, the generally circular lines are located as far from the heating end as possible, to reduce the likelihood that the lines will be damaged during the smoking experience. The generally circular lines may be printed on the smoking article with infra red (IR), ultra violet (UV) or visible ink or even using phosphorescent or fluorescent markings. In other embodiments, the generally circular lines may be printed on the smoking article with any type of suitable metallic inks.

In the embodiment shown in FIG. 2a, the generally circular lines 201 include a plurality of lines and spaces of varying width. These may be encoded as a simple one dimensional barcode, according to appropriate barcode encoding standards (see below). Alternatively, the generally circular lines may include a plurality n of lines and spaces of the same width for encoding the information related to the cigarette type. For example, with n=3, the following codes are possible: 000, 001, 010, 100, 011, 110, 101, 111, where 1 represents a line, and 0 represents a space. 001, 010 and 100 may not be distinguishable from each other (unless a marker line is provided to indicate to the detector where the encoding begins). Similarly, 011 and 110 may not be distinguishable from each other. Thus, five possibilities are provided with n=3. If 000 is used to indicate that no article is present, only four possibilities are provided. In general, unless a marker line is provided, $2^{n-1}+1$ possibilities are provided or, if 000. is used to indicate that no article is present, only $2^{n-1}$ possibilities are provided.

Alternatively, the generally circular lines may include two lines, one of fixed width F and one of variable width V for encoding the information related to the cigarette type. In this case, the cigarette type would be given by V/F. The generally circular lines 201 do not need to extend around the entire cigarette. Preferably, however, the generally circular lines extend around the majority of the cigarette, so that they can be easily detected by detector 203.

There are a number of barcode standards that might be suitable for use with the articles of the invention. One barcode type that may be useful for the present invention is the "Interleaved 2 of 5" (I2/5) barcode, which is a high-density, continuous two-width barcode symbology. The code has bars (black lines) and spaces (white lines), each of which can be wide or narrow. I2/5 encodes a pair of digits per five bars and spaces: the first digit is encoded in the five bars, while the second digit is encoded in the five spaces interleaved with them. Two out of every five bars or spaces are wide. Alternatively, another standard barcode symbology may be used, or a custom code specifically for this application might be developed.

In FIG. 2a, the detector in the electrically heated smoking system is shown schematically at 203. In this embodiment, the detector 203 includes a source of suitable light (IR, UV or visible, depending on the ink used on the article) and at least one photosensor that detects the reflected light. The detector may include a single sensor that detects the reflected light. In that case, detection of the smoking article may be performed as the smoking article is being inserted into the cavity, by measuring the time for the various lines to pass the detector. Or, the detector may include a plurality of sensors that detect the reflected light. In that case, detection of the smoking article may be performed once the cigarette has been inserted into the cavity. Because the lines extend around substantially the cigarette's entire circumference, if a plurality of sensors are used, they only need extend in one dimension along the longitudinal axis of the cigarette. Also, there is no need for the user to manually align the printed information on the smoking article with the detector.

It should be understood that the features described in relation to the smoking article of FIG. 2a may also be used with another type of smoking article or with a cleaning article.

Figure 2B:
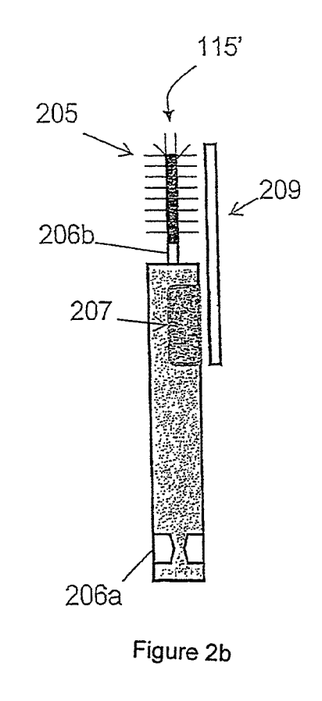

FIG. 2b shows schematically a cleaning article 115'. The cleaning article includes cleaning means in the form of cleaning brush 205. In FIG. 2b, information related to the cleaning article is encoded using a two-dimensional (2D) barcode 207. The barcode is located on the portion of the cleaning article 115' which is to be received in the cavity 111. In this embodiment, the barcode 207 is located as far from the heating end as possible, to reduce the likelihood that the barcode will be damaged during the cleaning process. The barcode may be printed on the cleaning article with IR, UV or visible ink or even using phosphorescent or fluorescent markings or metallic ink. The 2D barcode may be in the form of a data matrix.

In the embodiment of FIG. 2b, the cleaning means includes a cleaning brush 205. Alternatively, the brush could be replaced with a swab, wipe or cloth, or another means for mechanically cleaning the inside of the cavity 111 (shown in FIG. 1). The cleaning means might also include cleaning ingredients, for example, added manually by a user before cleaning, or contained within the cleaning article for ejection during cleaning. In the embodiment of FIG. 2b, the cleaning article includes a power supply (for example a battery or capacitor), electronic hardware, and a brush actuator all housed within the article, which are not shown in FIG. 2b. In the embodiment of FIG. 2b, the cleaning brush can be actuated by one of two switches 206a and 206b. Actuation may cause the brush to vibrate or rotate, for example, under operation of the brush actuator connected to the power supply. 206a is a manual switch that can be operated by a user pressing on it. 206b is also manual, but is a pressure switch operated by applying gentle pressure to the cleaning article towards the cavity. In other embodiments, one of switches 206a, 206b may be included, or neither could be included and the cleaning article could rely on manual operation only. Upon detection of the cleaning article, the heating element may be activated. Depending on the particularly cleaning means in the cleaning article, this may assist with cleaning. In the embodiment of FIG. 2b, the cleaning brush 205 is suitable for a system in which the heating element is a disk heater, or external heater. The particular configuration of the brush can be altered for other types of heating element, for example an internal pin heater.

In FIG. 2b, the detector in the electrically heated smoking system is shown schematically at 209. In this embodiment, the detector 209 includes a linear array of detectors, each including a source of suitable light and a photosensor that detects the reflected light. Since the detector is a linear array of detectors, the cleaning article should be inserted into the cavity such that the barcode is aligned with the array. Alternatively, the cleaning article may be inserted into the cavity and then rotated manually by the user, in order for the entire barcode to pass alongside the array and thus for the linear array of detectors to read the two dimensional barcode. In another embodiment, the detector may include a two dimensional array of CCDs (charge coupled devices). In that case, the cleaning article should be inserted into the cavity such that the barcode is aligned with the CCD array. Alternatively, the cleaning article may be inserted into the cavity and then rotated manually by the user to align the barcode with the CCD array. In any case, the appropriate position or rotation amount of the article in the cavity can be indicated to the user using mechanical elements, for example a marker or groove in the article which aligns with a marker or groove on the cavity. In one embodiment, a protrusion is provided on the article which cooperates with a notch, groove or channel in the cavity. The protrusion preferably extends in a longitudinal direction along the article, and is arranged to align with a corresponding longitudinal groove in the cavity wall. Alternatively, the protrusion may be provided in the cavity, with the corresponding groove on the article.

Alternatively, to avoid the need for the article to be properly aligned or rotated in the cavity, the two dimensional barcode may be repeatedly printed around the circumference of the article. If the detector includes a two dimensional array of devices, assuming the dimensions of the array are sufficient, the detector's field of view will be sufficient to read all portions of the barcode.

It should be understood that the features described in relation to the cleaning article of FIG. 2b may also be used with another type of cleaning article or with a smoking article.

The embodiments of FIGS. 2a and 2b use an optical emitter and sensor to detect the presence of the article in the cavity and to distinguish between various types of articles, using the information printed on the article. For a smoking article, this may be advantageous since the tipping paper or plug wrap of a cigarette can be used for printing, and the printing will probably not affect the smoke chemistry when the smoking article is heated.

Figure 2C:
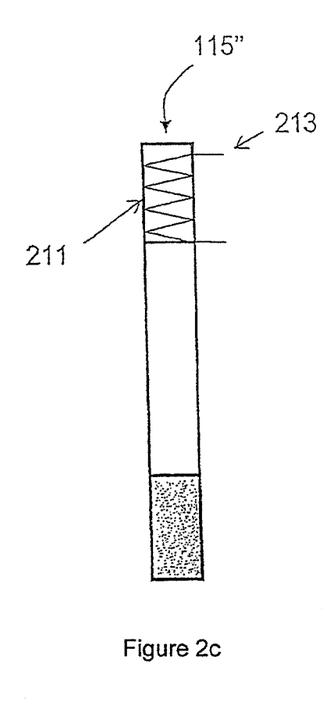

FIG. 2c shows a smoking article, in the form of a cigarette 115". In FIG. 2c, metal powder is mixed into the tobacco in the aerosol-forming substrate in the cigarette 115". This is shown schematically at aerosol-forming plug 211. Variations in the amount of metal powder can indicate different cigarette types. In FIG. 2c, the detector in the electrically heated smoking system is an inductive sensor including an induction coil surrounding the smoking article. This is shown schematically at 213. In this embodiment, the coil 213 is connected periodically and an increase in current indicates the presence of a cigarette in the cavity. The amount of current increase differentiates between different cigarette types. The metal could equally be included in another form, for example as a metallised barcode, for example, printed on the cigarette.

Using an inductive sensor, rather than an optical sensor, may be advantageous since the detector will not be affected by any contaminants in the system. It should be understood that the features described in relation to the smoking article of FIG. 2c may also be used with another type of smoking article or with a cleaning article. If used with a cleaning article, the metallic elements may be incorporated in the cleaning brush bristles or central core, or within the remaining portion of the cleaning article.

In the embodiments shown in FIGS. 2a, 2b and 2c, information related to the smoking article or the cleaning article is encoded on the structure of the article. This allows the electrically heated smoking system to, not only detect the presence of an article in the cavity, but also to identify one type of article from a number of different types usable with the device. For a smoking article, this enables the electrically heated smoking system to tailor the heating to the particular cigarette type or the particular user, or both. For example, particular substrates may require higher operating temperatures or longer heating times. For a cleaning article, this enables the electrically heated smoking system to tailor the heating to the particular cleaning means. For example, particular cleaning ingredients may provide an improved clean with higher operating temperatures or longer heating times. In addition, the cleaning operation can be adjusted depending on the smoking articles used with the system. For example, more frequent use of smoking articles will require more frequent or longer duration cleaning, or certain types of smoking articles may require more frequent or longer duration cleaning or different cleaning ingredients. In addition, identification of the particular article allows various information regarding the articles to be stored, for example, the number of smoking articles smoked, the types of tobacco, the number of smoking articles to next clean, and the preferred type of cleaning article.

Figure 2D:
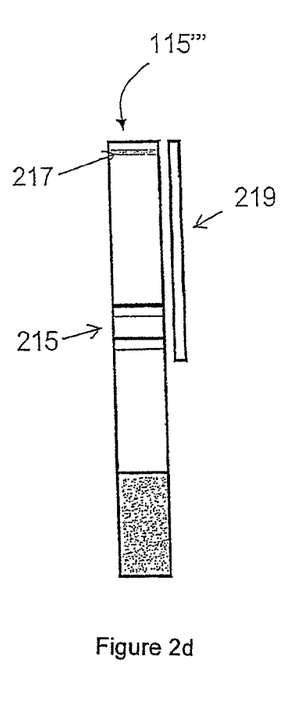

FIG. 2d shows a smoking article, in the form of a cigarette 115'''. As in FIG. 2a, information related to the cigarette type is encoded using a plurality of generally circular lines 215. The generally circular lines 215 are located on the portion of the cigarette 115''' which is to be received in the cavity 111 (shown in FIG. 1) and are located as far from the heating end as possible, to reduce the likelihood that the lines will be damaged during the smoking experience. In addition, an additional generally circular line 217 is provided on the cigarette. Line 217 is located close to the heating end and is designed to change during the heating involved in the smoking experience. Alteration of the line will indicate that the cigarette has been smoked.

As in FIGS. 2a and 2b, generally circular lines 215 may be printed on the smoking article with infra red (IR), ultra violet (UV), visible ink or even using phosphorescent or fluorescent markings or metallic inks. Circular line 217 may be printed with thermally sensitive ink arranged to change or disappear when in the high temperatures reached within the cavity. Or another mechanism, allowing the line to alter in appearance during heating, may be used.

In FIG. 2d, the detector is shown schematically at 219. The detector may be any sort of suitable sensor, as described above with reference to FIGS. 2a and 2b. The detector is arranged to use generally circular lines 215 to detect the presence of the cigarette and identify the cigarette, and to use circular line 217 to determine whether the cigarette has been smoked. A single detector is shown in FIG. 2d, but separate detectors for lines 215 and 217 respectively, may be provided. It is possible for the line 217 to indicate simply whether the cigarette has or has not been smoked. Or, the line 217 may indicate how much the cigarette has been smoked. Such information can indicate whether further puffs are available from the cigarette and other similar information. Such information may be stored in the hardware. Such information may also be displayed to the user.

In the embodiment of FIG. 2d, one set of information (lines 215) is used to identify the cigarette and another set of information (line 217) is used to identify whether, and optionally how much, the cigarette has been smoked. However, it is equally possible for a single set of information to indicate both the cigarette type and whether it has been smoked. For example, one set of lines might provide encoded information on the cigarette, as well as be arranged to change during heating. The position of the lines on the cigarette will be appropriate depending on the purpose of the lines.

It should be understood that the features described in relation to the smoking article of FIG. 2d may also be used with another type of smoking article or with a cleaning article. If used with a cleaning article, line 217 will indicate whether the cleaning article has already been used for cleaning and optionally how much cleaning the cleaning article has performed. In addition, a number of different printed arrangements (for example a barcode or a data matrix) may be used in place of the circular lines.

Although the embodiments illustrated in FIGS. 2a, 2c and 2d show a smoking article in the form of a cigarette, having a solid aerosol-forming substrate, this need not be the case. The aerosol-forming substrate may be a solid substrate provided in a different form, such as in a capsule that is completely contained within the electrically heated smoking system. The aerosol-forming substrate may, alternatively, be a liquid substrate, such as described in EP-A 1 736 065. The aerosol-forming substrate may be any other suitable type of substrate.

In addition, the illustrated embodiments shown an electrically heated smoking system in which a user puffs directly on the smoking article. However, this need not be the case. The user could puff directly on the system, for example on a mouthpiece.

The described embodiments of the invention provide a number of advantages. Firstly, the system allows for reasonable manufacturing tolerances in the cigarette dimensions. The system allows for variability in environmental factors, such as temperature and humidity. The system is reasonably robust, to allow for consumer handling. The system also provides reliable, consistent operation for a variety of smoking article and cleaning article types.

In this specification, the word "about" is often used in connection with numerical values to indicate that mathematical precision of such values is not intended. Accordingly, it is intended that where "about" is used with a numerical value, a tolerance of ±10% is contemplated for that numerical value.

In this specification the words "generally" and "substantially" are sometimes used with respect to terms. When used with geometric terms, the words "generally" and "substantially" are intended to encompass not only features which meet the strict definitions but also features which fairly approximate the strict definitions. In this connection, the term "circular" is intended to also include configurations including two or more substantially straight line segments describing the "circular" feature.

While the foregoing describes in detail a preferred an article including identification information for use in an electrically heated smoking system with reference to a specific embodiment thereof, it will be apparent to one skilled in the art that various changes and modifications may be made to the article, which do not materially depart from the spirit and scope of the foregoing description. Accordingly, all such changes, modifications, and equivalents that fall within the spirit and scope of the appended claims are intended to be encompassed thereby.

We claim:

1. A cleaning article comprising:
encoded identification information on the cleaning article, said cleaning article being configured for cleaning an electrically heated smoking system having a detector for detecting the cleaning article and distinguishing the cleaning article from other articles based on the encoded identification information.

2. The cleaning article of claim 1, wherein the identification information is printed on the article.

3. The cleaning article of claim 1, wherein the identification information comprises at least one of visible ink, ultra violet (UV) ink, infra red (IR) ink, phosphorescent ink, fluorescent ink or metallic ink.

4. The cleaning article of claim 1, wherein the identification information comprises one or more of: smoking article type, aerosol-forming substrate type, cleaning article type, cleaning means information, cleaning ingredient type, date of production, place of production, production batch number, other production details, and use-by date.

5. The cleaning article of claim 1, wherein the identification information is arranged to change as the article is used.

6. An electrically heated smoking system for receiving the cleaning article of claim 1, the system comprising:
a cavity for at least partially receiving the cleaning article, the cleaning article including the encoded identification information thereon;
at least one heating element;
a power supply for supplying power to the at least one heating element;
electrical hardware connected to the power supply and the at least one heating element; and
a detector capable of detecting the presence of the cleaning article in the cavity and distinguishing the cleaning article from a smoking article receivable in the cavity among articles, based on the identification information.

7. The electrically heated smoking system of claim 6, wherein the system is arranged to initiate, when the detector detects the cleaning article in the cavity.

8. The electrically heated smoking system of claim 6, wherein the electrical hardware is arranged to establish a heating protocol for the at least one heating element based on the cleaning article identified by the detector.

9. The electrically heated smoking system of claim 6, wherein the detector comprises an optical sensor including at least one light emitter and at least one light sensor, and the identification information is printed on the cleaning article.

10. The electrically heated smoking system of claim 6, wherein the identification information is configured to be altered during heating so as to indicate whether the cleaning article has been used.

* * * * *